(12) United States Patent
Zhai et al.

(10) Patent No.: US 11,561,092 B2
(45) Date of Patent: Jan. 24, 2023

(54) METHOD FOR MEASURING ANTENNA DOWNTILT ANGLE BASED ON MULTI-SCALE DEEP SEMANTIC SEGMENTATION NETWORK

(71) Applicant: Wuyi University, Jiangmen (CN)

(72) Inventors: Yikui Zhai, Jiangmen (CN); Jihua Zhou, Jiangmen (CN); Yueting Wu, Jiangmen (CN); Yu Zheng, Jiangmen (CN); Ying Xu, Jiangmen (CN); Junying Gan, Jiangmen (CN); Junying Zeng, Jiangmen (CN); Wenbo Deng, Jiangmen (CN); Qirui Ke, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 332 days.

(21) Appl. No.: 16/652,346

(22) PCT Filed: Mar. 1, 2019

(86) PCT No.: PCT/CN2019/076718
§ 371 (c)(1),
(2) Date: Mar. 30, 2020

(87) PCT Pub. No.: WO2020/093630
PCT Pub. Date: May 14, 2020

(65) Prior Publication Data
US 2021/0215481 A1    Jul. 15, 2021

(30) Foreign Application Priority Data

Nov. 9, 2018 (CN) .......................... 201811338415.4

(51) Int. Cl.
*G06T 7/73* (2017.01)
*G01B 21/22* (2006.01)
(Continued)

(52) U.S. Cl.
CPC .......... *G01B 21/22* (2013.01); *G06N 3/0454* (2013.01); *G06T 7/11* (2017.01); *G06T 7/73* (2017.01);
(Continued)

(58) Field of Classification Search
CPC combination set(s) only.
See application file for complete search history.

(56) References Cited

U.S. PATENT DOCUMENTS 9,596,617 B2 *  3/2017  Priest .................... H04W 24/08
9,918,235 B2    3/2018  Brennan et al.
(Continued)

FOREIGN PATENT DOCUMENTS

CN   103256920 A   8/2013
CN   103630107 A   3/2014
(Continued)

*Primary Examiner* — Cindy Trandai
(74) *Attorney, Agent, or Firm* — Vivacqua Crane, PLLC

(57) ABSTRACT

A method for measuring an antenna downtilt angle based on a multi-scale deep semantic segmentation network is disclosed, including: collecting base station antenna data by using an unmanned aerial vehicle, and labeling an acquired antenna image with a labeling tool to make a data set; calling the data set for training and debugging a model; recognizing and detecting a target antenna, performing semantic segmentation on an output image, finally obtaining a target image finally segmented, and calculating a downtilt angle of the target image. The method is highly applicable, cost-effective, and safe.

5 Claims, 9 Drawing Sheets

(51) Int. Cl.
*G06T 7/11* (2017.01)
*G06N 3/04* (2006.01)
(52) U.S. Cl.
CPC .............. *G06T 2207/20081* (2013.01); *G06T 2207/20084* (2013.01)

(56) References Cited

U.S. PATENT DOCUMENTS

| | | | | |
|---|---|---|---|---|
| 10,402,689 | B1* | 9/2019 | Bogdanovych | G06K 9/6256 |
| 10,565,787 | B1* | 2/2020 | Jordan | G06T 17/05 |
| 10,872,228 | B1* | 12/2020 | Zhou | G06V 20/64 |
| 11,257,198 | B1* | 2/2022 | Holub | G06V 10/82 |
| 2011/0116708 | A1* | 5/2011 | Zhou | G06V 10/426 382/164 |
| 2011/0150317 | A1* | 6/2011 | Kim | G06T 7/73 382/141 |
| 2014/0205205 | A1 | 7/2014 | Neubauer | |
| 2015/0278632 | A1* | 10/2015 | Rodriguez-Serrano | G06K 9/6215 382/160 |
| 2016/0271796 | A1* | 9/2016 | Babu | B25J 11/0075 |
| 2017/0077586 | A1* | 3/2017 | Li | G01B 11/26 |
| 2018/0089505 | A1* | 3/2018 | El-Khamy | G06N 3/0454 |
| 2018/0137642 | A1* | 5/2018 | Malisiewicz | G06V 20/64 |
| 2018/0218351 | A1* | 8/2018 | Chaubard | G01G 19/4144 |
| 2018/0260415 | A1* | 9/2018 | Gordo Soldevila | G06V 10/454 |
| 2019/0015059 | A1* | 1/2019 | Itu | G06F 16/285 |
| 2019/0043003 | A1* | 2/2019 | Fisher | G06V 10/82 |
| 2019/0130189 | A1* | 5/2019 | Zhou | G06V 20/41 |
| 2019/0213438 | A1* | 7/2019 | Jones | G06V 30/194 |
| 2019/0332118 | A1* | 10/2019 | Wang | G06T 7/194 |
| 2020/0090519 | A1* | 3/2020 | Ding | G08G 1/168 |
| 2020/0218961 | A1* | 7/2020 | Kanazawa | G06N 20/20 |
| 2022/0004770 | A1* | 1/2022 | Lei | G06V 10/82 |

FOREIGN PATENT DOCUMENTS

| | | |
|---|---|---|
| CN | 104504381 A | 4/2015 |
| CN | 106683091 A | 5/2017 |
| CN | 107664491 A | 2/2018 |
| CN | 107830846 A | 3/2018 |

* cited by examiner

|   | Type | Filter | Size | Output |
|---|---|---|---|---|
|   | Convolutional layer | 32 | 3 x 3 | 256 x 256 |
|   | Convolutional layer | 64 | 3 x 3/2 | 128 x 128 |
| 1 x | Convolutional layer | 32 | 1 x 1 |   |
|   | Convolutional layer | 64 | 3 x 3 |   |
|   | Residual |   |   | 128 x 128 |
|   |   | 128 | 3 x 3/2 | 64 x 64 |
| 2 x | Convolutional layer | 64 | 1 x 1 |   |
|   | Convolutional layer | 128 | 3 x 3 |   |
|   | Residual |   |   | 64 x 64 |
|   |   | 256 | 3 x 3/2 | 32 x 32 |
| 8 x | Convolutional layer | 128 | 1 x 1 |   |
|   | Convolutional layer | 256 | 3 x 3 |   |
|   | Residual |   |   | 32 x 32 |
|   |   | 512 | 3 x 3/2 | 16 x 16 |
| 8 x | Convolutional layer | 256 | 1 x 1 |   |
|   | Convolutional layer | 512 | 3 x 3 |   |
|   | Residual |   |   | 16 x 16 |
|   |   | 1024 | 3 x 3/2 | 8 x 8 |
| 4 x | Convolutional layer | 512 | 3 x 3 |   |
|   | Convolutional layer | 1024 |   |   |
|   | Residual |   |   | 8 x 8 |
|   | Average pooling |   | Global |   |
|   | Connect |   | 1000 |   |
|   | Multi-classification |   |   |   |

FIG. 4

METHOD FOR MEASURING ANTENNA DOWNTILT ANGLE BASED ON MULTI-SCALE DEEP SEMANTIC SEGMENTATION NETWORK

CROSS REFERENCE TO RELATED APPLICATIONS

This application is a national stage application under 35 U.S.C. 371 of PCT Application No. PCT/CN2019/076718, filed on 1 Mar. 2019, which PCT application claimed the benefit of Chinese Patent Application No. 2018113384154, filed on 9 Nov. 2018, the entire disclosure of each of which are hereby incorporated herein by reference.

TECHNICAL FIELD

The present disclosure relates to the field of mobile communication, and in particular, to a method for measuring an antenna downtilt angle based on a multi-scale deep semantic segmentation network.

BACKGROUND

Nowadays, in the era of network information, the quality of mobile communication networks is extremely important. In GSM-R construction and planning, as shown in FIG. 1, an azimuth angle and a downtilt angle of an antenna affect the coverage of signals and the interference between the signals, so the antenna needs to be timely calculated and adjusted strictly to improve the quality of network signals.

There are two traditional methods to measure the antenna downtilt angle: the first one is climbing to an antenna base station manually and using a measuring instrument (a compass, a slope meter, or the like) for measurement; and the second one is installing an angle sensor on the antenna to return data. The antenna is susceptible to wind, snow and other factors, resulting in a change in the downtilt angle, so it needs to be measured regularly. For the first method, as the base station is high and the number of the antennas is larger, the manual safety hazard and workload are larger, and the practicability is low. For the second method, the installation time is long, and the antenna models are different, so the installation cost of the instruments is high and the practicability is not high. Both the two methods consume a lot of manpower and material resources and are not suitable for large-scale measurement today.

SUMMARY

To solve the above problems, the present disclosure aims at providing a method for measuring an antenna downtilt angle based on a multi-scale deep semantic segmentation network. The method for measuring a downtilt angle of a mobile base station antenna by calling a target detection algorithm and a semantic segmentation algorithm and using an unmanned aerial vehicle as a carrier is highly applicable, cost-effective, and safe.

The technical scheme adopted by the present disclosure to solve the problems is as follows:

An antenna downtilt angle measuring method based on a multi-scale deep semantic segmentation network, including:

collecting image data: base station antenna data is collected by using an unmanned aerial vehicle and antenna images collected are taken as a data set;

predicting a target bounding box: a target antenna in the data set is positioned, and a bounding box is predicted by logistic regression;

performing target recognition and semantic segmentation: target features of the target antenna in the data set are extracted, the target features are learned and processed by an activation function, a target image is output for semantic image segmentation, and pixel points of the target image and the background are classified; and calculating an antenna downtilt angle: the width and height of an antenna box are obtained according to a border of the target image to calculate the antenna downtilt angle.

Further, the collecting image data includes:

locating the unmanned aerial vehicle on the top of a pole of a base station antenna, and recording the longitude and latitude (L0, W0) of the pole in the vertical direction; causing the unmanned aerial vehicle to fly around a point of the base station antenna, setting a flight radius of the unmanned aerial vehicle, and the unmanned aerial vehicle moving around the pole along the radius on the same horizontal plane to acquire antenna images with different attitudes and angles of a mobile base station antenna as a data set.

Further, the predicting a target bounding box includes:

positioning a target antenna in the antenna image, predicting a bounding box by logistic regression, first dividing the entire antenna image into N*N grids, predicting the entire antenna image after the antenna image is input, scanning each grid at a time, and starting to predict the target antenna when the center of the grid where the target antenna is located is positioned, wherein 4 coordinate values predicted for each bounding box are $t_x$, $t_y$, $t_w$, and $t_h$, respectively, an upper-left offset of each target cell is ($c_x$, $c_y$), box heights of prior bounding boxes are $p_x$, $p_y$ respectively, and the network predicts their values as:

$$b_x = \sigma(t_x) + c_x \quad (1)$$

$$b_y = \sigma(t_y) + c_y \quad (2)$$

$$b_w = p_w e^{t_w} \quad (3)$$

$$b_h = p_h e^{t_h} \quad (4)$$

where $\sigma(\cdot)$ denotes the activation function, which can be expressed as:

$$\sigma(x) = 1/1 + e^{-x}$$

where $p_w$, $p_h$ denote the width and height of the prior bounding boxes respectively, e denotes the natural constant, which is about equal to 2.71828;

where $b_x$, $b_y$, $b_w$, $b_h$ can be calculated according the above formulas, wherein $b_w$ and $b_h$ denote the width and the height of the bounding boxes respectively, where the input antenna image is divided into N*N grids, each grid includes five predictors (x, y, w, h, confidence) and a c class, and the output of the network is of a size of S*S*(5*B+C); B is the number of the bounding boxes in each grid, C means the class is only antenna in the present disclosure, and thus is 1, and confidence represents that the predicted grid includes two pieces of information, i.e., confidence of the target antenna and prediction accuracy of the bounding box:

$$\text{confidence} = \Pr(\text{object}) * \text{IOU}_{prd}^{truth} \quad (5)$$

where $\text{IOU}_{prd}^{truth}$ denotes Intersection over Union between the bounding boxes and the prior bounding boxes, and where a threshold is set to 0.5 when Pr(Object)=1; the target antenna falls in the center of the grid, that is, the bounding box currently predicted coincides with an actual background box object better than before; if the predicted bounding box is not the best currently, the bounding box is not predicted when the threshold is smaller than 0.5, and it is determined that the target antenna does not fall into the grid.

Further, the performing target recognition and semantic segmentation includes:

performing target recognition by using a network convolutional layer for feature extraction: antenna image pixel 416*416 is input, the channel number is 3, there are 32 layers of convolution kernels, each kernel has a size of 3*3, 32 layers of convolution kernels are used to learn 32 feature maps, and for color differences of the target antenna, features of the target antenna are learned by using different convolution kernels; convolutional layer up-sampling is performed during feature extraction, and a prediction formula for object classes is as follows:

$$\Pr(\text{Class}_i|\text{object})*\Pr(\text{object})*\Pr(\text{object}) \\ *\text{IOU}_{pred}^{truth}=\Pr(\text{object})*\text{IOU}_{pred}^{truth} \quad (6)$$

where Pr(Class$_i$|object) is an object class probability;

then applying the activation function by logistic regression:

$$f(x) = \frac{1}{1+e^{-x}} \quad (7)$$

a predicted target output range is made between 0 and 1, the antenna image is processed by the activation function after feature extraction, and when the output value is greater than 0.5, the object is determined as an antenna;

then performing semantic image segmentation on the antenna image by using a deep convolutional network, and classifying the pixel points of the target image and the background:

after the target image is input, it first goes through feature extraction by a dilated convolutional network; and after a feature image is input, dilated convolution is calculated:

$$y[i]=\Sigma_k x[i+r*k]*w[k] \quad (8)$$

for a two-dimensional signal, an output corresponding to each position i is y, w is a filter, and the detour rate r is a step size for sampling the input signal;

after the input image is processed by the convolutional network for output, pixel points of the output target image are classified by a fully connected conditional random field, and the classification is mainly performed for the target image and the background boundary.

Further, the calculating an antenna downtilt angle includes:

obtaining the width x and the height y of the antenna box according to the border of the target image, and calculating a downtilt angle of the base station antenna according to a geometric relation, the downtilt angle of the base station antenna being an angle θ between the base station antenna and a vertical plane:

$$\theta = \arctan\frac{x}{y}. \quad (12)$$

The present disclosure has the following beneficial effects: the present disclosure adopts an antenna downtilt angle measuring method based on a multi-scale deep semantic segmentation network. The method for measuring a downtilt angle of a mobile base station antenna by calling a target detection algorithm and a semantic segmentation algorithm and using an unmanned aerial vehicle as a carrier is highly applicable, cost-effective, and safe.

BRIEF DESCRIPTION OF THE DRAWINGS

The present disclosure is further described below with reference to the accompanying drawings and examples.

FIG. 4 is a schematic diagram of a network structure for an antenna downtilt angle measuring method based on a multi-scale deep semantic segmentation network according to an embodiment of the present disclosure;

DETAILED DESCRIPTION

Figure 1:
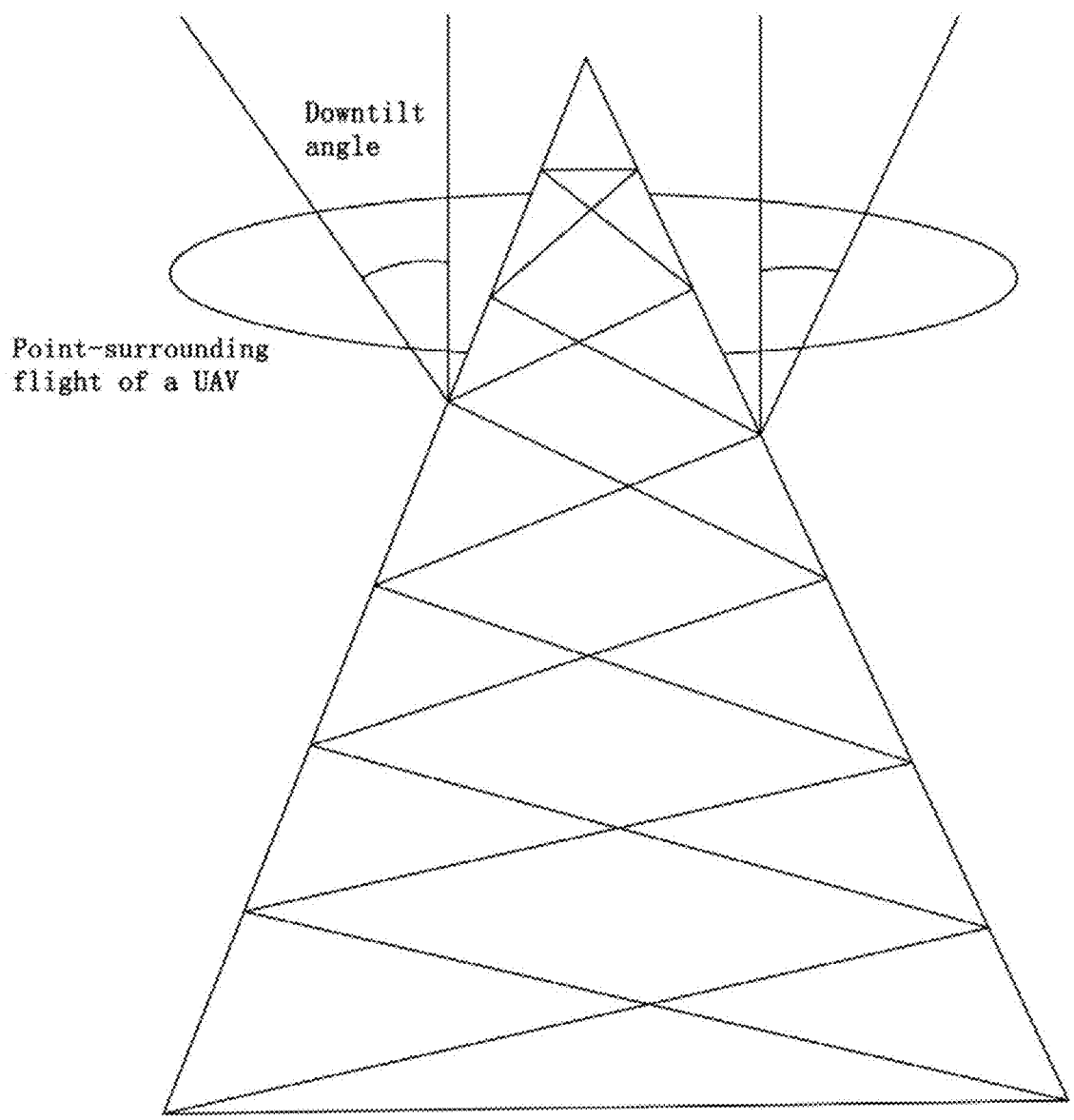
FIG. 1 is a schematic diagram of a downtilt angle of a base station antenna.
Figure 2:
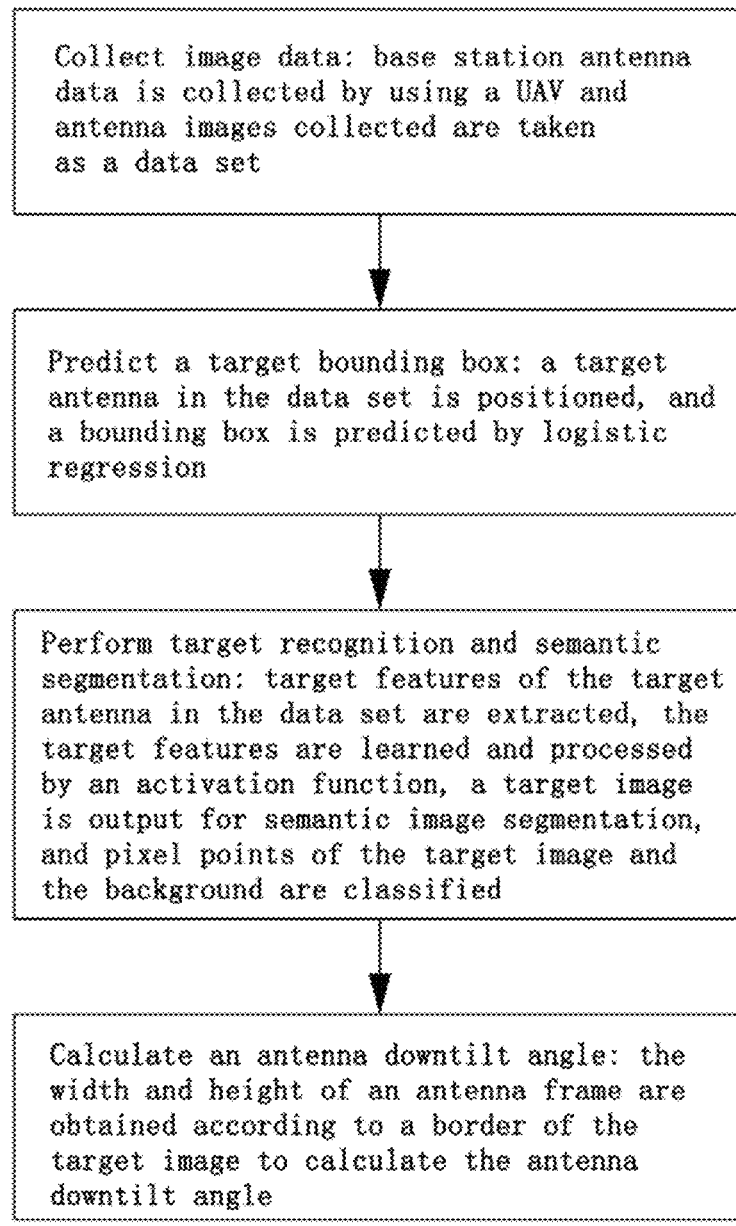
FIG. 2 is a flowchart of an antenna downtilt angle measuring method based on a multi-scale deep semantic segmentation network according to an embodiment of the present disclosure.

Referring to FIG. 2, an antenna downtilt angle measuring method based on a multi-scale deep semantic segmentation network is provided in an embodiment of the present disclosure, including:

collecting image data: base station antenna data is collected by using an unmanned aerial vehicle and antenna images collected are taken as a data set;

predicting a target bounding box: a target antenna in the data set is positioned, and a bounding box is predicted by logistic regression;

performing target recognition and semantic segmentation: target features of the target antenna in the data set are extracted, the target features are learned and processed by an activation function, a target image is output for semantic image segmentation, and pixel points of the target image and the background are classified; and calculating an antenna downtilt angle: the width and height of an antenna box are obtained according to a border of the target image to calculate the antenna downtilt angle.

In the embodiment, the method for measuring a downtilt angle of a mobile base station antenna by calling a target detection algorithm and a semantic segmentation algorithm and using an unmanned aerial vehicle as a carrier is highly applicable, cost-effective, and safe.

Further, the step of collecting image data includes:

locating the unmanned aerial vehicle on the top of a pole of a base station antenna, and recording the longitude and latitude (L0, W0) of the pole in the vertical direction; causing the unmanned aerial vehicle to fly around a point of the base station antenna, setting a flight radius of the unmanned aerial vehicle, and the unmanned aerial vehicle moving around the pole along the radius on the same horizontal plane to acquire antenna images with different attitudes and angles of a mobile base station antenna as a data set.

Figure 3:
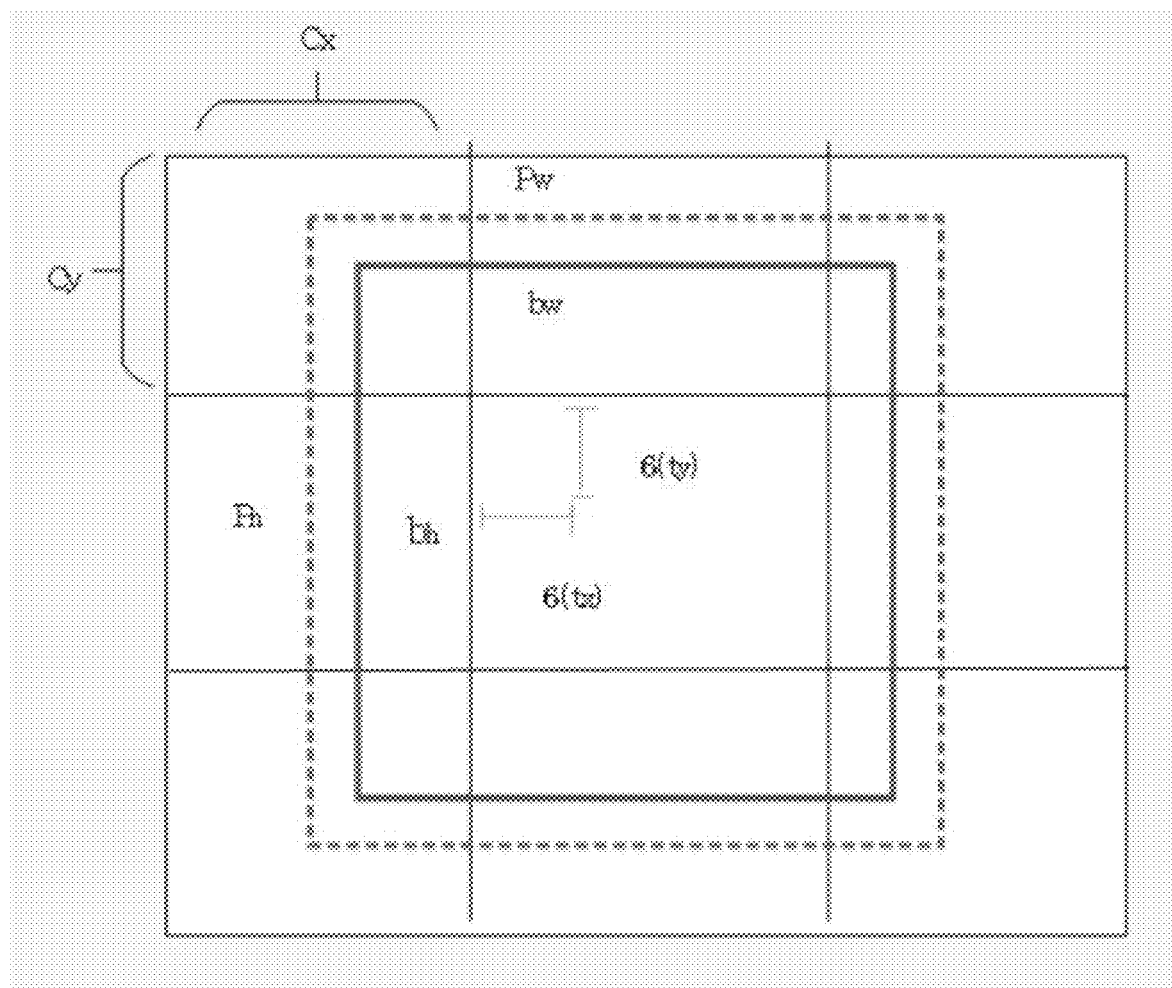
FIG. 3 is a schematic diagram of border prediction for an antenna downtilt angle measuring method based on a multi-scale deep semantic segmentation network according to an embodiment of the present disclosure.

Further, the step of predicting a target bounding box includes:

positioning a target antenna in the antenna image, predicting a bounding box by logistic regression, first dividing the entire antenna image into N*N grids, predicting the entire antenna image after the antenna image is input, scanning each grid at a time, and starting to predict the target antenna when the center of the grid where the target antenna is located is positioned, wherein 4 coordinate values predicted for each bounding box are $t_x$, $t_y$, $t_w$, and $t_h$, respectively, an upper-left offset of each target cell is ($c_x$, $c_y$), box heights of prior bounding boxes are $p_x$, $p_y$, respectively, box prediction is as shown in FIG. 3, and the network predicts their values as:

$$b_x = \sigma(t_x) + c_x \quad (1)$$

$$b_y = \sigma(t_y) + c_y \quad (2)$$

$$b_w = p_w e^{t_w} \quad (3)$$

$$b_h = p_h e^{t_h} \quad (4)$$

where $\sigma(\cdot)$ denotes the activation function, which can be expressed as:

$$\sigma(x) + 1/1e^{-x}$$

where $p_w$, $p_h$ denote the width and height of the prior bounding boxes respectively, e denotes the natural constant, which is about equal to 2.71828; where $b_x$, $b_y$, $b_w$, $b_h$ can be calculated according the above formulas, wherein band $b_h$ denote the width and the height of the bounding boxes respectively, where the input antenna image is divided into N*N grids, each grid includes 5 predictors (x, y, w, h, confidence) and a c class, and the output of the network is of a size of S*S*(5*B+C); B is the number of the bounding boxes in each grid, C means the class is only antenna in the present disclosure, and thus is 1, and confidence represents that the predicted grid includes two pieces of information, i.e., confidence of the target antenna and prediction accuracy of the bounding box:

$$\text{confidence} = \text{Pr(object)} * \text{IOU}_{prd}^{truth} \quad (5)$$

where $\text{IOU}_{prd}^{truth}$ denotes Intersection over Union between the bounding boxes and the prior bounding boxes, and where a threshold is set to 0.5 when Pr(Object)=1; the target antenna falls in the center of the grid, that is, the bounding box currently predicted coincides with an actual background box object better than before; if the predicted bounding box is not the best currently, the bounding box is not predicted when the threshold is smaller than 0.5, and it is determined that the target antenna does not fall into the grid.

In the accuracy of a target, multi-scale prediction is used. There is no need to fix the size of an input image, so different step sizes can be used to detect feature maps of different sizes. Three different detection layers are used to detect the antenna image for the target antenna, and different detection layers are realized by controlling the step size. The first detection layer is down-sampled with a step size of 32 to reduce the feature dimension. In order to connect with the previous identical feature graph, the layer is up-sampled, and a high resolution can be obtained at this point. The second detection layer with a step size of 16 is used, and the remaining feature processing is consistent with that of the first layer. The step size is set to 8 in the third layer, feature prediction is performed thereon, and finally, the detection accuracy of the target antenna is greater.

Further, the step of performing target recognition and semantic segmentation includes:

performing target recognition by using a network convolutional layer for feature extraction: antenna image pixel 416*416 is input, the channel number is 3, there are 32 layers of convolution kernels, each kernel has a size of 3*3, 32 layers of convolution kernels are used to learn 32 feature maps, and for color differences of the target antenna, features of the target antenna are learned by using different convolution kernels; convolutional layer up-sampling is performed during feature extraction, and a prediction formula for object classes is as follows:

$$\text{Pr(Class}_i|\text{object}) * \text{Pr(object)} * \text{Pr(object)} * \text{IOU}_{pred}^{truth} = \text{Pr(object)} * \text{IOU}_{pred}^{truth} \quad (6)$$

wherein $\text{Pr(Class}_i|\text{object})$ is an object class probability;

then applying the activation function by logistic regression:

$$f(x) = \frac{1}{1 + e^{-x}} \quad (7)$$

a predicted target output range is made between 0 and 1, the antenna image is processed by the activation function after feature extraction, and when the output value is greater than 0.5, the object is determined as an antenna;

in a network layer structure, there are 53 convolutional layers and 22 residual layers among layers 0-74; layers 75-105 are feature interaction layers of a neural convolutional network, which can be divided into three scales; local feature interaction is realized by means of convolution kernels, and its network structure is as shown in FIG. 4.

In the production of the data set, only the antenna is detected, so the class is 1. Therefore, in the training, the output of the last convolutional layer is 3*(1+4+1)=18.

Semantic Segmentation

Semantic image segmentation is performed on the antenna image by using a deep convolutional network, and the pixel points of the target image and the background are classified.

After the target image is input, it first goes through feature extraction by a dilated convolutional network. Since the measured boundary precision is not high enough, the pixel of the target image cannot be well separated from the background pixel, and the pixel classification of the image boundary can be improved by combining a fully connected conditional random field, so that the segmentation effect can be better.

Figure 6:
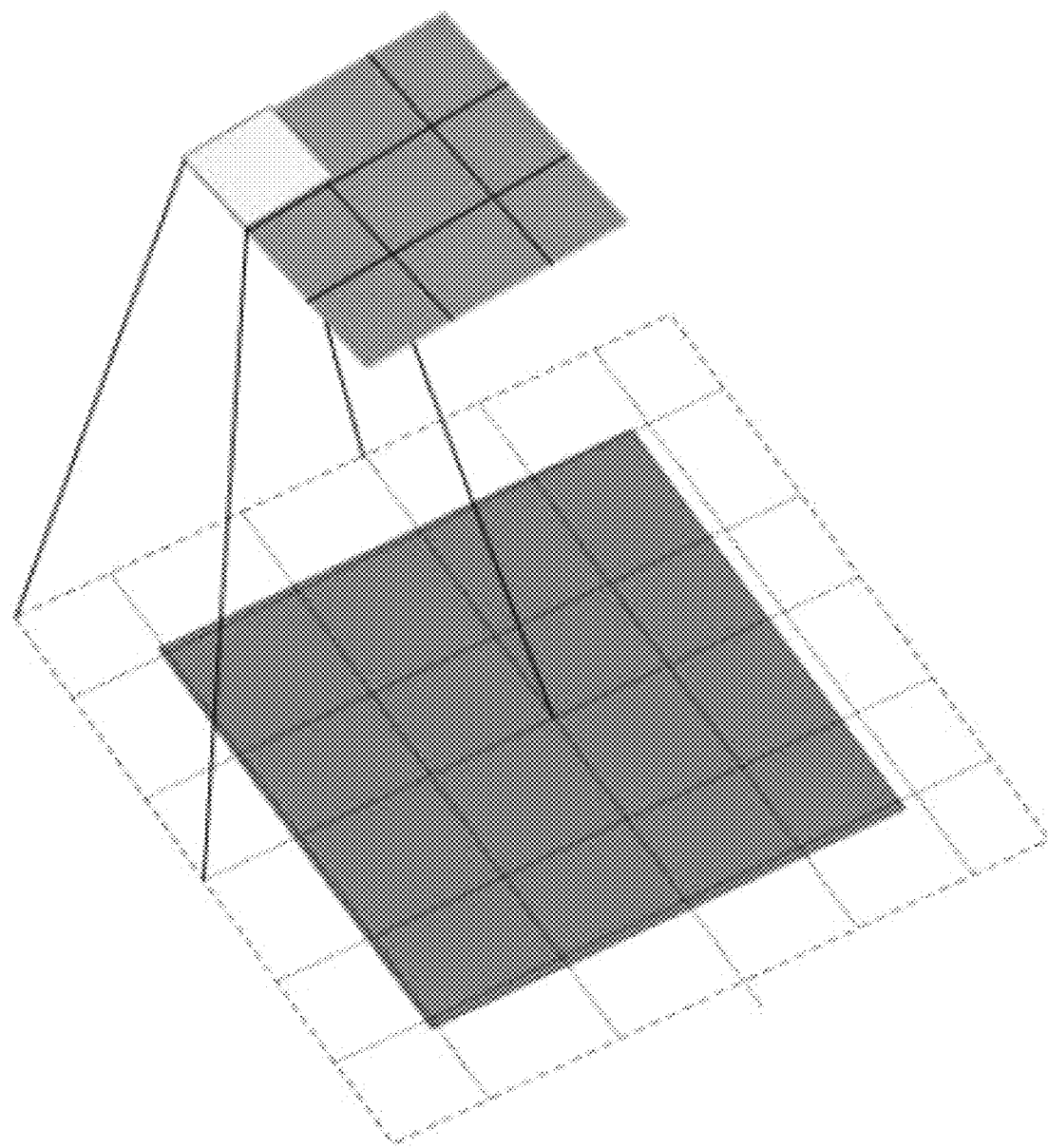
FIG. 6 is a schematic diagram of standard convolution for an antenna downtilt angle measuring method based on a multi-scale deep semantic segmentation network according to an embodiment of the present disclosure.
Figure 7:
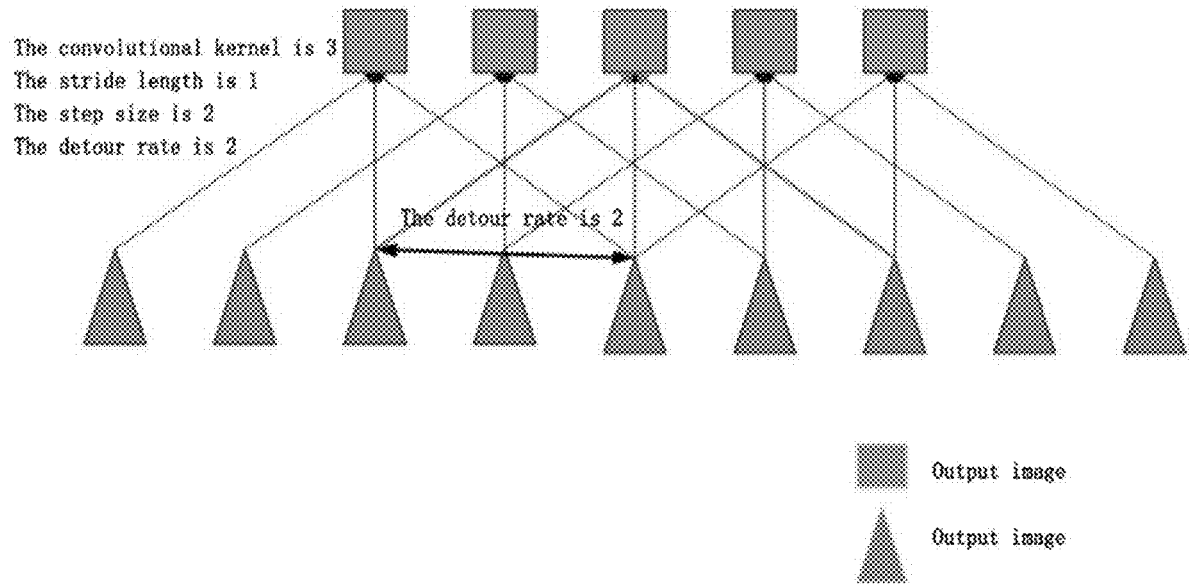
FIG. 7 is a schematic diagram of high-resolution feature extraction for an antenna downtilt angle measuring method based on a multi-scale deep semantic segmentation network according to an embodiment of the present disclosure.
Figure 8:
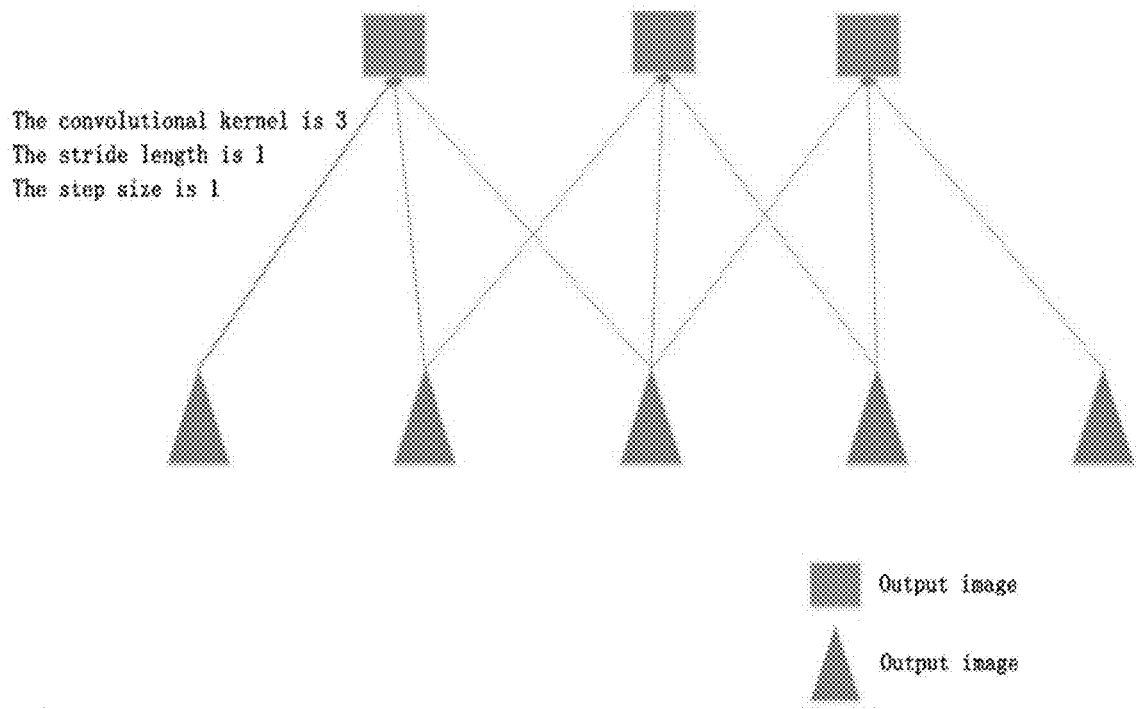
FIG. 8 is a schematic diagram of one-dimensional low-resolution feature extraction for an antenna downtilt angle measuring method based on a multi-scale deep semantic segmentation network according to an embodiment of the present disclosure.
Figure 9:
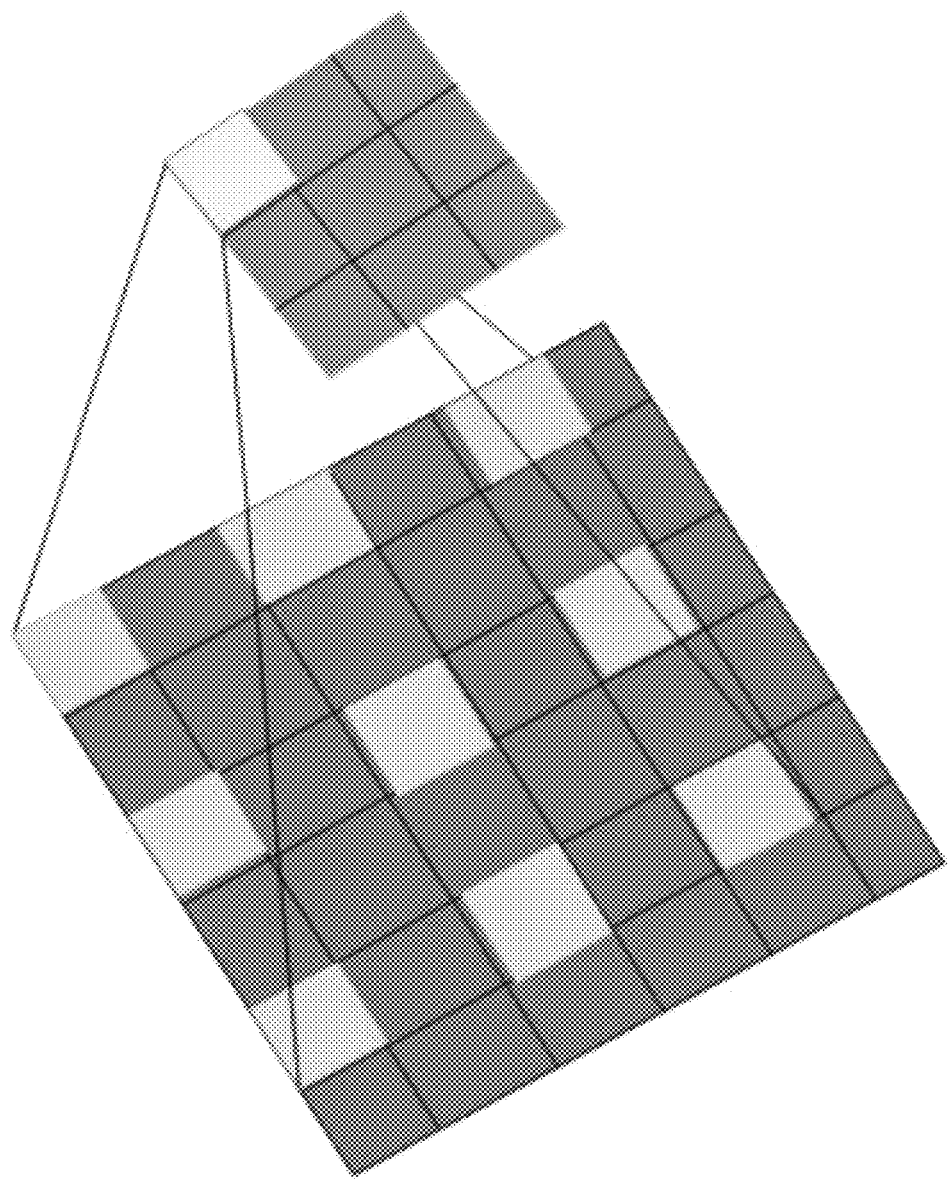
FIG. 9 is a schematic diagram of dilated convolution for an antenna downtilt angle measuring method based on a multi-scale deep semantic segmentation network according to an embodiment of the present disclosure.

It is first feature-extracted by using a dilated convolutional network. The feature extraction of the network convolutional layer can be divided into two cases: a low-resolution input image is feature-extracted by a standard convolutional layer, as shown in FIG. 6. Dense features of a high-resolution input image are extracted by a detour convolution at a rate of 2, as shown in FIG. 7, and its step size is set to 2 to thus reduce the feature dimension. In the convolutional network layer, the convolution kernel is set to 3, the stride length is 1, and the step size is 1. FIG. 8 is a schematic diagram of one-dimensional low-resolution feature map extraction. FIG. 9 is a schematic diagram of dilated convolution.

In a network structure of a serial module and a spatial pyramid pooling layer module, the convolution with holes can effectively increase a receptive field of a filter and integrate multi-scale information. After a feature image is input, dilated convolution is calculated:

$$y[i]=\Sigma_k x[i+r*k]*w[k] \qquad (8)$$

Figure 5:
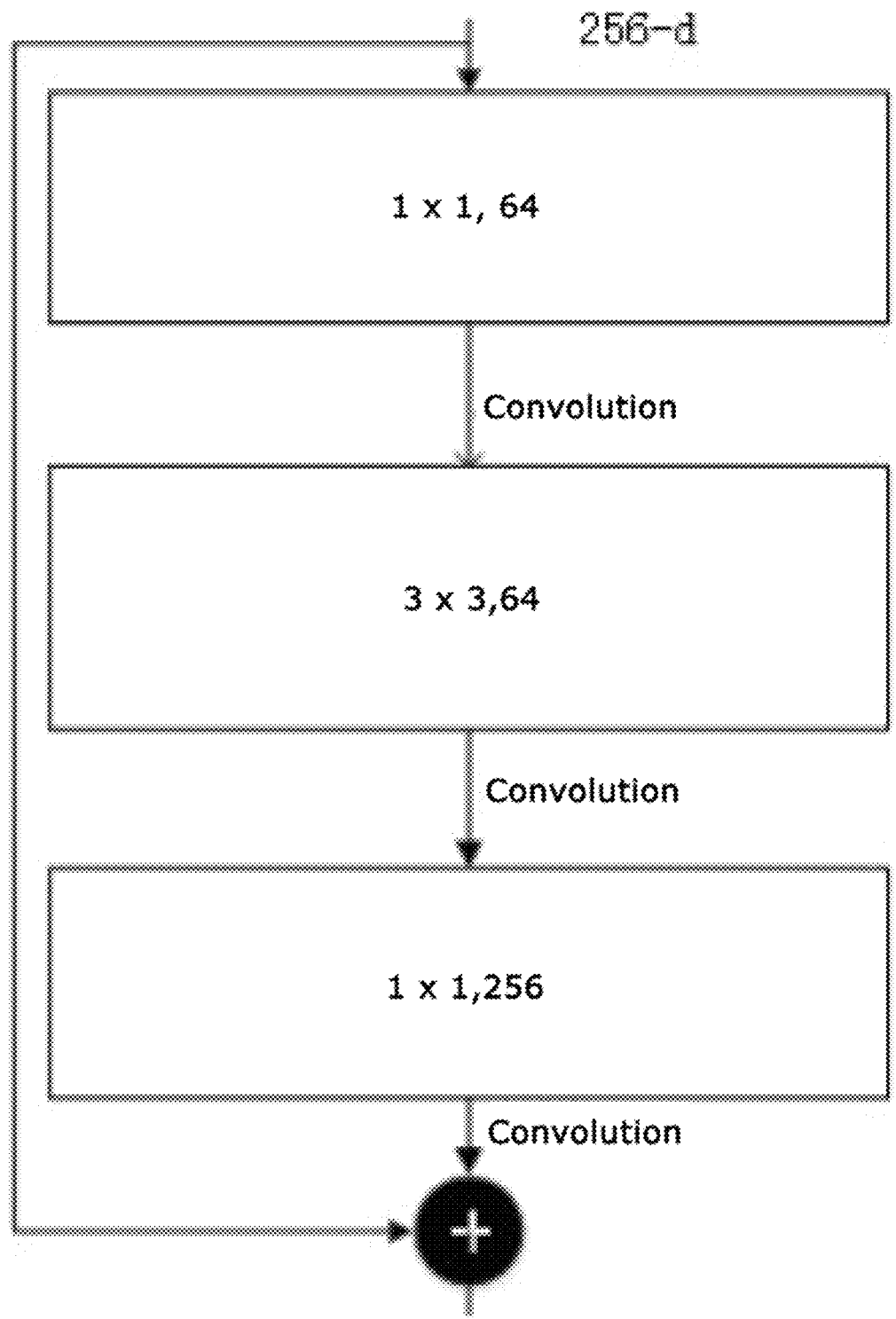
FIG. 5 is a schematic diagram of a bottleneck block for an antenna downtilt angle measuring method based on a multi-scale deep semantic segmentation network according to an embodiment of the present disclosure.

For a two-dimensional signal, an output corresponding to each position i is y, w is a filter, and the detour rate r is a step size for sampling the input signal. The receptive field of the filter can be improved, and the convolution with holes can enlarge the convolution kernel. A residual module of multi-scale feature learning is used in the feature network extraction, while the bottleneck block is used in the present disclosure. In the bottleneck block, each convolution is processed by normalization and processed by an activation function. Thus, contextual information of the context is enriched, and the bottleneck block is as shown in FIG. 5.

After the input image is processed by the convolutional network for output, pixel points of the output target image are classified by a fully connected conditional random field, and the classification is mainly performed for the target image and the background boundary.

Figure 10:
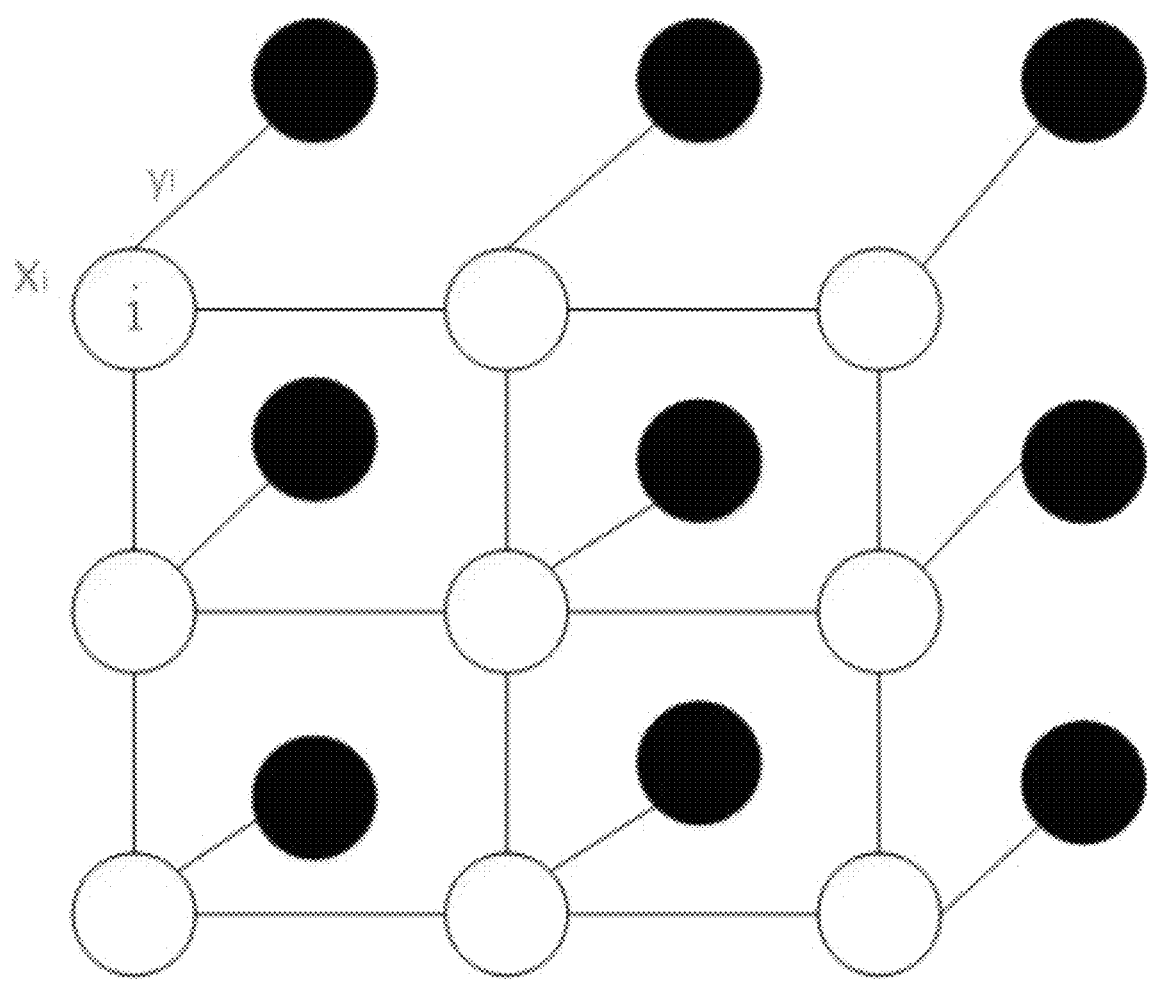
FIG. 10 is a view of a random field for an antenna downtilt angle measuring method based on a multi-scale deep semantic segmentation network according to an embodiment of the present disclosure.

A view of a random field is as shown in FIG. 10. Each circle represents a pixel point, xi (white circle) is a labeled pixel point (node), two connected pixel points are edges of the pixel, yi (black circle) is a reference value of xi, and the classification of the labeled pixel points is determined by the reference value yi. According to the Gibbs distribution function, $$P(Y=y|I) = \frac{1}{Z(I)} \exp(-E(y|I)) \qquad (9)$$

where y is the reference value of xi, E(y|I) is an energy function.

$$E(y|I) = \sum_i \Psi_u(y_i) + \sum_{i<y} \Psi_p(y_i, y_j) \qquad (10)$$

An image function output through a dilated convolutional network is a unary potential function: A binary potential function is $$\Psi_P(y_i, y_j) = u(y_i, y_j) \sum_{m=1}^{M} w^{(m)} k_G^{(m)}(f_i, f_j) \qquad (11)$$

The function the relationship between pixels, and will assign the same symbols to the same prime points. The unary potential function extracts feature vectors of a node in different feature maps, and the binary function connects the nodes extracted by the unitary potential function to learn its edges. All the nodes are connected to form a conditional random field of a fully connected layer, and an image finally output by the function is more accurate.

Further, the step of calculating an antenna downtilt angle includes:

obtaining the width x and the height y of the antenna box according to the border of the target image, and calculating a downtilt angle of the base station antenna according to a geometric relation, the downtilt angle of the base station antenna being an angle θ between the base station antenna and a vertical plane:

$$\theta = \arctan\frac{x}{y}. \qquad (12)$$

The above are merely preferred embodiments of the present disclosure. The present disclosure is not limited to the above implementations. As long as the implementations can achieve the technical effect of the present disclosure with the same means, they are all encompassed in the protection scope of the present disclosure.

The invention claimed is:

1. A method for measuring an antenna downtilt angle based on a multi-scale deep semantic segmentation network, comprising:
    collecting image data: wherein base station antenna data is collected by using an unmanned aerial vehicle, and antenna images collected are taken as a data set;
    predicting a target bounding box: wherein a target antenna in the data set is positioned, and a bounding box is predicted by logistic regression;
    performing target recognition and semantic segmentation: wherein target features of the target antenna in the data set are extracted, the target features are learned and processed by an activation function, a target image is output for semantic image segmentation, and pixel points of the target image and the background are classified; and
    calculating an antenna downtilt angle: wherein the width and height of an antenna box are obtained according to a border of the target image to calculate the antenna downtilt angle;
    wherein the step of predicting a target bounding box comprises:
    positioning a target antenna in the antenna image, predicting a bounding box by logistic regression, first dividing the entire antenna image into N*N grids, predicting the entire antenna image after the antenna image is input, scanning each grid at a time, and starting to predict the target antenna when the center of the grid where the target antenna is located is positioned, wherein four coordinate values predicted for each bounding box are $t_x$, $t_y$, $t_w$, and $t_h$, respectively, an upper-left offset of each target cell is ($c_x$, $c_y$), box heights of prior bounding boxes are $p_x$, $p_y$ respectively, and the network predicts their values as:

$$b_x=\sigma(t_x)+c_x$$

$$b_y=\sigma(t_y)+c_y$$

$$b_w=p_w e^{t_w}$$

$$b_h=p_h e^{t_h}$$

where $\sigma(\cdot)$ denotes the activation function, which can be expressed as:

$$\sigma(x)=\frac{1}{1+e^{-x}}$$

where $p_w$, $p_h$ denote the width and height of the prior bounding boxes respectively, e denotes the natural constant, which is about equal to 2.71828;

where $b_x$, $b_y$, $b_w$, $b_h$ can be calculated according the above formulas, wherein $b_w$ and $b_h$ denote the width and the height of the bounding boxes respectively, where the input antenna image is divided into N*N grids, each grid comprises 5 predictors (x, y, w, h, confidence) and a c class, and the output of the network is of a size of S*S*(5*B+C); B is the number of the bounding boxes in each grid, C means the class is only antenna in the present disclosure, and thus is 1, and confidence represents that the predicted grid comprises two pieces of information, i.e., confidence of the target antenna and prediction accuracy of the bounding box:

$$\text{confidence}=Pr(\text{object})*IOU_{prd}^{truth}$$

where $IOU_{prd}^{truth}$ denotes Intersection over Union between the bounding boxes and the prior bounding boxes.

2. The method for measuring an antenna downtilt angle based on a multi-scale deep semantic segmentation network according to claim 1, wherein the step of collecting image data comprises:

locating the unmanned aerial vehicle on the top of a pole of a base station antenna, and recording the longitude and latitude ($L_0$, $W_0$) of the pole in the vertical direction; causing the unmanned aerial vehicle to fly around a point of the base station antenna, setting a flight radius of the unmanned aerial vehicle, and the unmanned aerial vehicle moving around the pole along the radius on the same horizontal plane to acquire antenna images with different attitudes and angles of a mobile base station antenna as a data set.

3. The method for measuring an antenna downtilt angle based on a multi-scale deep semantic segmentation network according to claim 2, wherein:

a threshold is set to 0.5 when Pr(Object)=1; the target antenna falls in the center of the grid, that is, the bounding box currently predicted coincides with an actual background box object better than before; if the predicted bounding box is not the best currently, the bounding box is not predicted when the threshold is smaller than 0.5, so as to determine that the target antenna does not fall into the grid.

4. The method for measuring an antenna downtilt angle based on a multi-scale deep semantic segmentation network according to claim 3, wherein the step of performing target recognition and semantic segmentation comprises:

performing target recognition by using a network convolutional layer for feature extraction: antenna image pixel 416*416 is input, the channel number is 3, there are 32 layers of convolution kernels, each kernel has a size of 3*3, 32 layers of convolution kernels are used to learn 32 feature maps, and for color differences of the target antenna, features of the target antenna are learned by using different convolution kernels; convolutional layer up-sampling is performed during feature extraction, and a prediction formula for object classes is as follows:

$$Pr(\text{Class}_i|\text{object})*Pr(\text{object})*Pr(\text{object})$$
$$*IOU_{pred}^{truth}=Pr(\text{object})*IOU_{pred}^{truth}$$

wherein Pr(Classi/object) is an object class probability;

then applying the activation function by logistic regression:

$$f(x)=\frac{1}{1+e^{-x}}$$

a predicted target output range is made between 0 and 1, the antenna image is processed by the activation function after feature extraction, and when the output value is greater than 0.5, the object is determined as an antenna;

then performing semantic image segmentation on the antenna image by using a deep convolutional network, and classifying the pixel points of the target image and the background:

after the target image is input, the feature extraction goes through by a dilated convolutional network; and after a feature image is input, dilated convolution is calculated:

$$y[i]=\Sigma_k x[i+r*k]*w[k]$$

for a two-dimensional signal, an output corresponding to each position i is y, w is a filter, and the detour rate r is a step size for sampling the input signal;

after the input image is processed by the convolutional network for output, pixel points of the output target image are classified by a fully connected conditional random field, and the classification is mainly performed for the target image and the background boundary.

5. The method for measuring an antenna downtilt angle based on a multi-scale deep semantic segmentation network according to claim 4, wherein the step of calculating an antenna downtilt angle comprises:

obtaining the width x and the height y of the antenna box according to the border of the target image, and calculating a downtilt angle of the base station antenna according to a geometric relation, the downtilt angle of the base station antenna being an angle θ between the base station antenna and a vertical plane:

$$\theta=\arctan\frac{x}{y}.$$

* * * * *